(12) United States Patent
Dogan et al.

(10) Patent No.: US 6,650,714 B2
(45) Date of Patent: Nov. 18, 2003

(54) SPATIAL PROCESSING AND TIMING ESTIMATION USING A TRAINING SEQUENCE IN A RADIO COMMUNICATIONS SYSTEM

(75) Inventors: Mithat C. Dogan, Sunnyvale, CA (US); Paul Petrus, Santa Clara, CA (US); Mitchell D. Trott, Mountain View, CA (US)

(73) Assignee: ArrayComm, Inc., San Jose, CA (US)

( * ) Notice: Subject to any disclaimer, the term of this patent is extended or adjusted under 35 U.S.C. 154(b) by 213 days.

(21) Appl. No.: 09/841,456

(22) Filed: Apr. 24, 2001

(65) Prior Publication Data

US 2002/0150182 A1 Oct. 17, 2002

Related U.S. Application Data

(63) Continuation-in-part of application No. 09/727,177, filed on Nov. 30, 2000.

(51) Int. Cl.$^7$ .............................................. H04L 27/06
(52) U.S. Cl. ....................... 375/343; 375/267; 375/347; 375/354
(58) Field of Search ................................. 375/260, 267, 375/340, 343, 347, 349, 354, 355, 130, 140, 142, 143, 147, 150, 371; 370/252, 334, 350, 516, 319, 320, 321, 342, 344, 347; 342/378; 455/73

(56) References Cited

U.S. PATENT DOCUMENTS 5,715,240 A * 2/1998 Borras et al. ................ 370/252
5,909,470 A 6/1999 Barratt et al. ................ 375/324
5,930,243 A 7/1999 Parish et al. ................. 370/334
6,330,294 B1 * 12/2001 Ansbro et al. ............... 375/347
6,483,459 B1 * 11/2002 Hou et al. .................... 342/378

FOREIGN PATENT DOCUMENTS

EP        0 999 652 A1    5/2000
WO       WO 00/16500 A1   3/2000

* cited by examiner

Primary Examiner—Chieh M. Fan
(74) Attorney, Agent, or Firm—Blakely, Sokoloff, Taylor & Zafman LLP

(57) ABSTRACT

A method and apparatus are provided that performs spatial processing, timing estimation and frequency offset using a training sequence of a received burst. According to one aspect of the present invention, the invention includes receiving a burst having a known training sequence at a set of diversity antennas, sampling the received burst at each antenna, determining a coarse timing estimate for samples from at least one antenna, and determining a spatial weighting vector using the coarse timing estimate. The embodiment further includes applying the spatial weighting vector to the received burst samples for each antenna to form a single channel signal, determining a fine timing estimate for the single channel signal, determining a second spatial weighting vector using the fine timing estimate, applying the second spatial weighting vector to the received burst samples for each antenna to form a second single channel signal, and demodulating the second single channel signal.

25 Claims, 5 Drawing Sheets

SPATIAL PROCESSING AND TIMING ESTIMATION USING A TRAINING SEQUENCE IN A RADIO COMMUNICATIONS SYSTEM

CROSS-REFERENCE TO RELATED APPLICATIONS

The present application is a continuation-in-part of prior application Ser. No. 09/727,177, filed Nov. 30, 2000, entitled Relative Timing Acquisition for a Radio Communications System and assigned to the assignee of the present application, the priority of which is hereby claimed. The disclosure of the prior application is hereby incorporated by reference fully herein.

BACKGROUND OF THE INVENTION

1. Field of the Invention

The present invention applies to the field of performing spatial processing of received signals in radio communications systems and, in particular, to combining spatial processing, timing estimates and frequency offsets, to resolve a signal using a training sequence.

2. Description of the Prior Art

Mobile radio communications systems such as cellular voice and data radio systems typically have several base stations in different locations available for use by mobile or fixed user terminals, such as cellular telephones or wireless web devices. Each base station typically is assigned a set of frequencies or channels to use for communications with the user terminals. The channels are different from those of neighboring base stations in order to avoid interference between neighboring base stations. As a result, the user terminals can easily distinguish the transmissions received from one base station from the signals received from another. In addition, each base station can act independently in allocating and using the channel resources assigned to it.

Such radio communications systems typically include a broadcast channel (BCH). The BCH is broadcast to all user terminals whether they are registered on the network or not and informs the user terminals about the network. In order to access the network, a user terminal normally tunes to and listens to the BCH before accessing the network. It will then use the information in the BCH to request access to the network. Such a request typically results in an exchange of information about the network using separate control and access channels and ends in the user terminal receiving an assignment to a traffic channel TCH of a particular base station.

Frequency and timing offset or delay can sometimes be determined by a user terminal based on the BCH, and it will be more precisely defined during the registration and assignment process discussed above. In a spatial diversity multiple access system, the base station can enhance the capacity of the system by determining the position and range to the user terminal as well as any other spatial parameters. These spatial parameters are also better developed as TCH is assigned. However, all of the timing, frequency and spatial parameters are subject to drift and change over time and for optimum performance must constantly be updated.

In order to accurately resolve the TCH messages and determine spatial parameters for transmitting return traffic, the timing or delay, frequency offset and spatial signature of the user terminal's message are all desired. Typically, it is preferred to accurately determine the timing or delay and frequency offset based on analyzing a long training sequence across a potentially long delay spread. This can create great demands on the processing resources of a base station and increase the amount of time required to generate a reply to the access request.

BRIEF SUMMARY OF THE INVENTION

A method and apparatus are provided that performs spatial processing, timing estimation and frequency offset using a training sequence of a received burst. According to one aspect of the present invention, the invention includes receiving a burst having a known training sequence at a set of diversity antennas, sampling the received burst at each antenna, determining a coarse timing estimate for samples from at least one antenna, and determining a spatial weighting vector using the coarse timing estimate. The embodiment further includes applying the spatial weighting vector to the received burst samples for each antenna to form a single channel signal, determining a fine timing estimate for the single channel signal, determining a second spatial weighting vector using the fine timing estimate, applying the second spatial weighting vector to the received burst samples for each antenna to form a second single channel signal, and demodulating the second single channel signal.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF THE INVENTION

Base Station Structure

Figure 1:
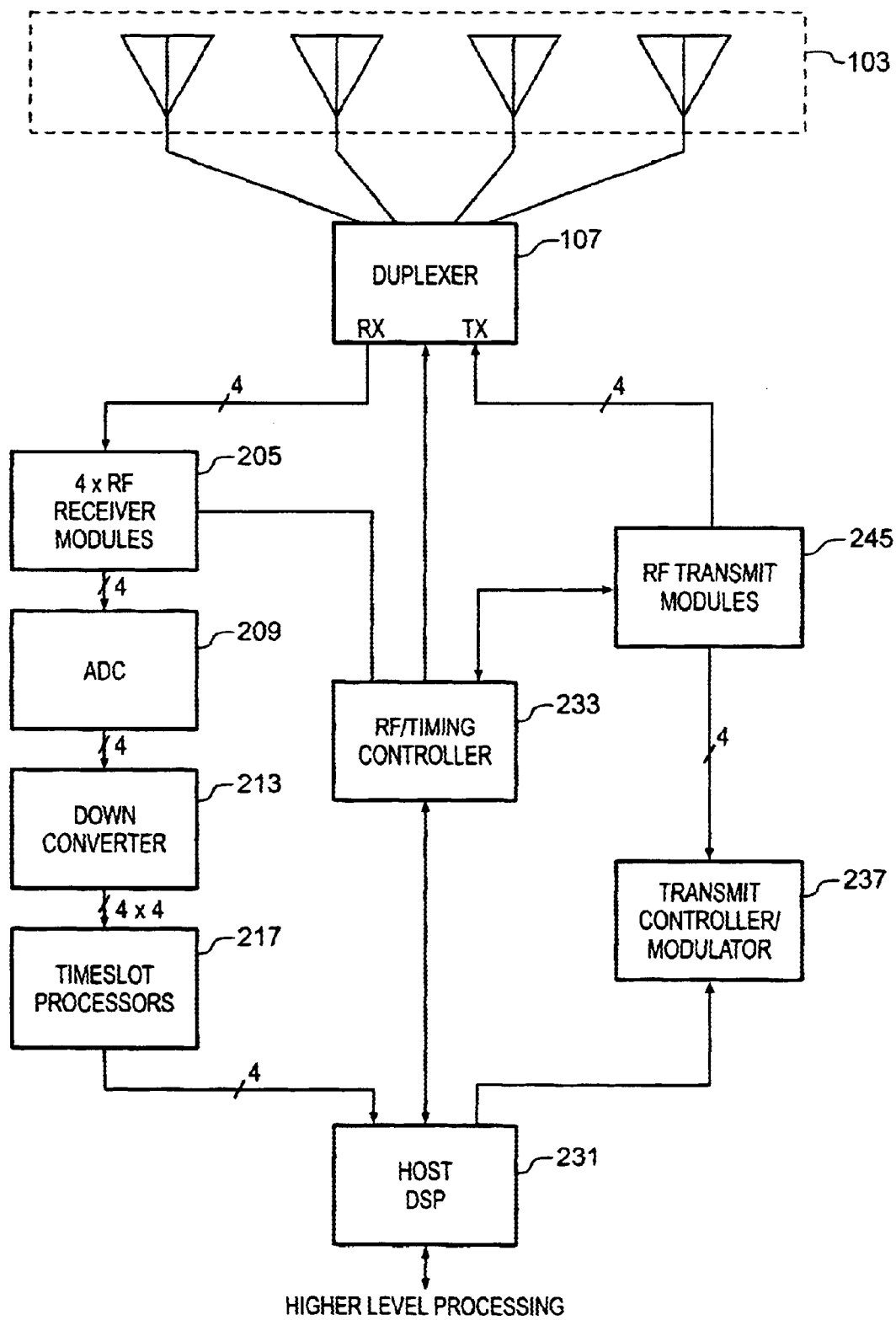
FIG. 1 is a simplified block diagram of a base station on which an embodiment of the invention can be implemented.

The present invention relates to wireless communication systems and may be a fixed-access or mobile-access wireless network using spatial division multiple access (SDMA) technology in combination with multiple access systems, such as time division multiple access (TDMA), frequency division multiple access (FDMA) and code division multiple access (CDMA). Multiple access can be combined with frequency division duplexing (FDD) or time division duplexing (TDD). FIG. 1 shows an example of a base station of a wireless communications system or network suitable for implementing the present invention. The system or network includes a number of subscriber stations, also referred to as remote terminals or user terminals, such as that shown in FIG. 2. The base station may be connected to a wide area network (WAN) through its host DSP 231 for providing any required data services and connections external to the immediate wireless system. To support spatial diversity, a plurality of antennas 103 is used, for example four antennas, although other numbers of antennas may be selected.

A set of spatial multiplexing weights for each subscriber station are applied to the respective modulated signals to produce spatially multiplexed signals to be transmitted by the bank of four antennas. The host DSP 231 produces and maintains spatial signatures for each subscriber station for each conventional channel and calculates spatial multiplexing and demultiplexing weights using received signal measurements. In this manner, the signals from the current active subscriber stations, some of which may be active on the same conventional channel, are separated and interference and noise suppressed. When communicating from the base station to the subscriber stations, an optimized multi-lobe antenna radiation pattern tailored to the current active subscriber station connections and interference situation is created. The same spatial signature is applied to signals received from the user terminal by the base station in order to resolve simultaneous signals on the same channel. Suitable smart antenna technologies for achieving such a spatially directed beam are described, for example, in U.S. Pat. No. 5,828,658, issued Oct. 27, 1998 to Ottersten et al. and U.S. Pat. No. 5,642,353, issued Jun. 24, 1997 to Roy, III et al.

The outputs of the antennas are connected to a duplexer switch 107, which in this TDD system is a time switch. Two possible implementations of switch 107 are as a frequency duplexer in a frequency division duplex (FDD) system, and as a time switch in a time division duplex (TDD) system. When receiving, the antenna outputs are connected via switch 107 to a receiver 205, and are mixed down in analog by RF receiver ("RX") modules 205 from the carrier frequency to an FM intermediate frequency ("IF"). This signal then is digitized (sampled) by analog to digital converters ("ADCs") 209. Only the real part of the signal is sampled. Final down-converting to baseband is carried out digitally. Digital filters can be used to implement the down-converting and the digital filtering, the latter using finite impulse response (FIR) filtering techniques. This is shown as block 213. The invention can be adapted to suit a wide variety of RF and IF carrier frequencies and bands.

There are, in the present example, four down-converted outputs from each antenna's digital filter device 213, one per receive timeslot. The particular number of timeslots can be varied to suit network needs. While the present example uses four uplink and four downlink timeslots for each TDD frame, desirable results have also been achieved with three timeslots for the uplink and downlink in each frame. For each of the four receive timeslots, the four down-converted outputs from the four antennas are fed to a digital signal processor (DSP) device 217 (hereinafter "timeslot processor") for further processing, including calibration, according to one aspect of this invention. Four Motorola DSP56303 DSPs can be used as timeslot processors, one per receive timeslot. The timeslot processors 217 monitor the received signal power and estimate the frequency offset and time alignment. They also determine smart antenna weights for each antenna element. These are used in the spatial diversity multiple access scheme to determine a signal from a particular remote user and to demodulate the determined signal.

The output of the timeslot processors 217 is demodulated burst data for each of the four receive timeslots. This data is sent to the host DSP processor 231 whose main function is to control all elements of the system and interface with the higher level processing, which is the processing which deals with what signals are required for communications in all the different control and service communication channels defined in the system's communication protocol. The host DSP 231 can be a Motorola DSP56303. In addition, timeslot processors send the determined receive weights for each user terminal to the host DSP 231. The host DSP 231 maintains state and timing information, receives uplink burst data from the timeslot processors 217, and programs the timeslot processors 217. In addition it decrypts, descrambles, checks error correcting code, and deconstructs bursts of the uplink signals, then formats the uplink signals to be sent for higher level processing in other parts of the base station. With respect to the other parts of the base station, it formats service data and traffic data for further higher processing in the base station, receives downlink messages and traffic data from the other parts of the base station, processes the downlink bursts and formats and sends the downlink bursts to a transmit controller/modulator, shown as 237. The host DSP also manages programming of other components of the base station including the transmit controller/modulator 237 and the RF/timing controller shown as 233.

The RF/timing controller 233 interfaces with the RF system, shown as block 245 and also produces a number of timing signals that are used by both the RF system and the modem. The RF/timing controller 233 reads and transmits power monitoring and control values, controls the duplexer 107 and receives timing parameters and other settings for each burst from the host DSP 231.

The transmit controller/modulator 237, receives transmit data from the host DSP 231, four symbols at a time. The transmit controller uses this data to produce analog IF outputs which are sent to the RF transmitter (TX) modules 245. Specifically, the received transmit data from the host DSP 231 are converted into a complex modulated signal, up-converted to an IF frequency, 4-times over-sampled, multiplied by transmit weights obtained from host DSP 231, and converted via digital to analog converters ("DACs") which are part of transmit controller/modulator 237 to analog transmit waveforms. The analog waveforms are sent to the transmit modules 245.

The transmit modules 245 up-convert the signals to the transmission frequency and amplify the signals. The amplified transmission signal outputs are sent to antennas 103 via the duplexer/time switch 107.

User Terminal Structure

Figure 2:
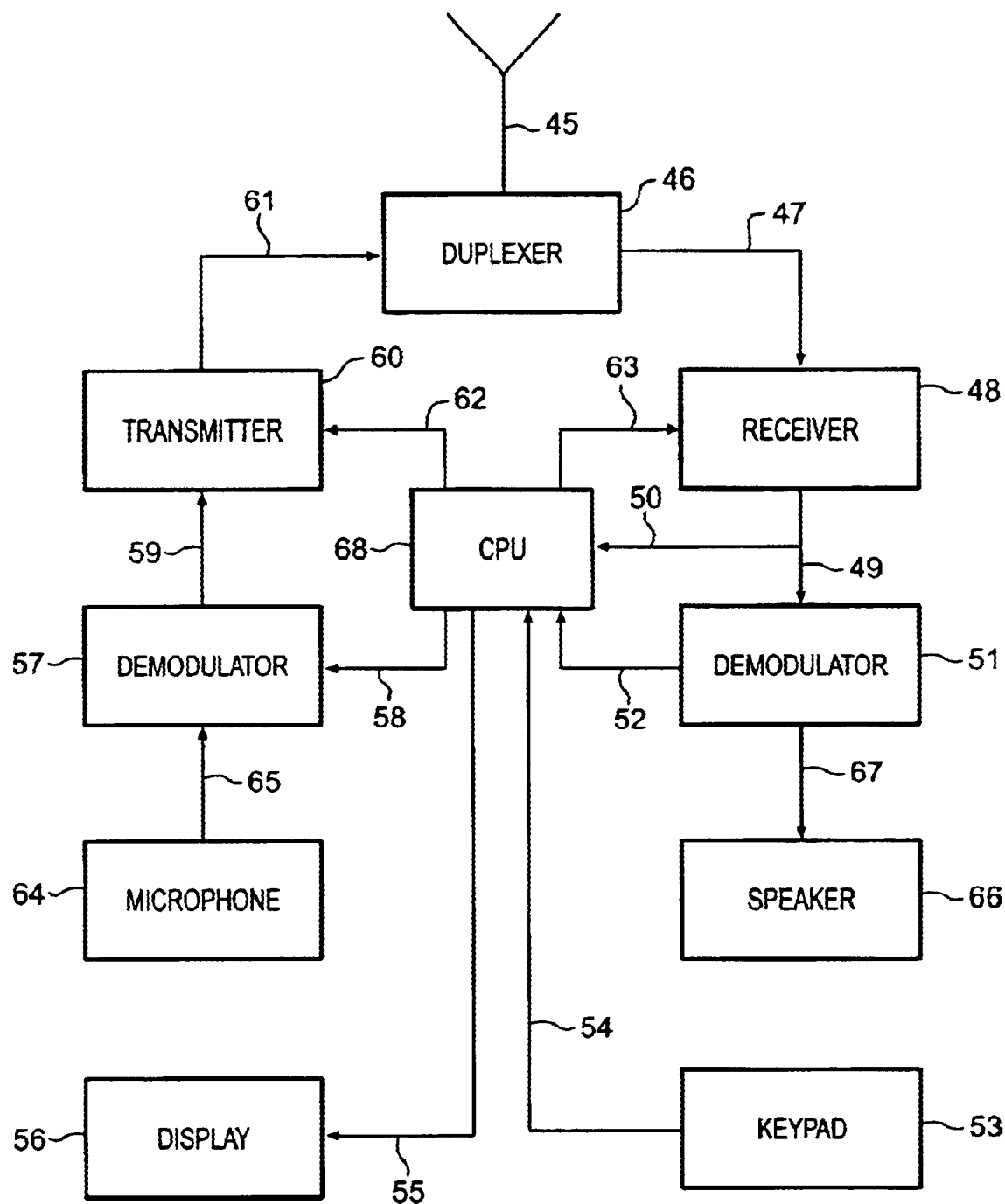
FIG. 2 is a block diagram of a remote terminal on which an embodiment of the invention can be implemented.

FIG. 2 depicts an example component arrangement in a remote terminal that provides data or voice communication. The remote terminal's antenna 45 is connected to a duplexer 46 to permit antenna 45 to be used for both transmission and reception. The antenna can be omni-directional or directional. For optimal performance, the antenna can be made up of multiple elements and employ spatial processing as discussed above for the base station. In an alternate embodiment, separate receive and transmit antennas are used eliminating the need for the duplexer 46. In another alternate embodiment, where time division diversity is used, a transmit/receive (TR) switch can be used instead of a duplexer as is well-known in the art. The duplexer output 47 serves as input to a receiver 48. The receiver 48 produces a down-converted signal 49 which is the input to a demodulator 51. A demodulated received sound or voice signal 67 is input to a speaker 66. In a data system, the demodulated signal is processed by the CPU or sent to other components (not shown).

The remote terminal has a corresponding transmit chain in which data or voice to be transmitted is modulated in a modulator 57. The modulated signal to be transmitted 59, output by the modulator 57, is up-converted and amplified by a transmitter 60, producing a transmitter output signal 61. The transmitter output 61 is then input to the duplexer 46 for transmission by the antenna 45.

The demodulated received data 52 is supplied to a remote terminal central processing unit 68 (CPU) as is received data before demodulation 50. The remote terminal CPU 68 can be implemented with a standard DSP (digital signal processor) device such as a Motorola series 56300 DSP. This DSP can also perform the functions of the demodulator 51 and the modulator 57. The remote terminal CPU 68 controls the receiver through line 63, the transmitter through line 62, the demodulator through line 52 and the modulator through line 58. It also communicates with a keyboard 53 through line 54 and a display 56 through line 55. A microphone 64 and speaker 66 are connected through the modulator 57 and the demodulator 51 through lines 65 and 67, respectively for a voice communications remote terminal. In another embodiment, the microphone and speaker are also in direct communication with the CPU to provide voice or data communications.

The remote terminal's voice signal to be transmitted 65 from the microphone 64 is input to a modulator 57. Traffic and control data to be transmitted 58 is supplied by the remote terminal's CPU 68. Control data 58 is transmitted to base stations during registration, session initiation and termination as well as during the session as described in greater detail below.

In an alternate embodiment, the speaker 66, and the microphone 64 are replaced or augmented by digital interfaces well-known in the art that allow data to be transmitted to and from an external data processing device (for example, a computer). In one embodiment, the remote terminal's CPU is coupled to a standard digital interface such as a PCMCIA interface to an external computer and the display, keyboard, microphone and speaker are a part of the external computer. The remote terminal's CPU 68 communicates with these components through the digital interface and the external computer's controller. For data only communications, the microphone and speaker can be deleted. For voice only communications, the keyboard and display can be deleted.

Broadcast Channel (BCH)

In one embodiment, the system of the present invention is initiated for each user terminal or remote terminal from the broadcast channel BCH which is transmitted as a burst from the base station to all potential user terminals. The BCH burst, unlike the traffic channel bursts, is transmitted in all directions where user terminals may be, typically omnidirectionally but the specific beam pattern will depend on the network. The BCH communicates enough basic information to enable a subsequent exchange of configuration request CR and configuration message CM between the base station and the user terminal. The BCH also provides general frequency offset and timing update information to all user terminals.

Table 1, below summarizes the content of an example of a BCH burst.

TABLE 1

| Duration | Contents |
| --- | --- |
| 10 μsec | ramp-up |
| 272 μsec | frequency correction training symbols $f_1, f_2, \ldots, f_{136}$ |
| 256 μsec | timing correction training symbols $t_1, t_2, \ldots t_{128}$ |
| 16 μsec | broadcast preamble $r_1, r_2, \ldots r_8$ |
| 512 μsec | information symbols $h'_1, h'_2, \ldots h'_{256}$ |
| 10 μsec | ramp-down |
| 14 μsec | inter-burst guard time |

The frequency and timing correction training symbols can be set according to any one of many approaches well-known in the art. They can also be combined, exchanged with a synchronization sequence or eliminated.

The broadcast information symbols are constructed from a 15-bit broadcast message which is modulated and coded into a 256-bit sequence. The number of symbols as well as the structure and sequence of transmitted bits can be varied to suit a wide variety of applications. The broadcast channel information symbols provide the information needed for a user terminal to request a configuration message from the base station.

Each broadcast message is mapped into a broadcast burst with the information shown below in Table 2.

TABLE 2

| Broadcast Message | |
| --- | --- |
| Field | # of Bits |
| BStxPwr | 5 |
| BSCC | 7 |
| BSload | 3 |
| Total | 15 |

BStxPwr is the effective isotropic radiated power of the broadcast message. This number indicates the power transmitted by the base station taking into account the number of amplifiers and diversity antennas available at the base station.

BSCC is the base station color code, used by the user terminal to select training data for uplink bursts and to distinguish broadcasts of different base stations.

BSload is an indication of the amount of unused capacity the base station has.

In one embodiment, the network is designed to take maximal advantage of spatial division multiple access technologies and particularly smart antenna array signal processing. To help maintain reliable spatial channels in an extremely dense frequency reuse pattern, the network uses time division duplex TDMA where uplink and downlink transmissions are always on the same frequency. In addition, because many user terminals are single antenna and transmit and receive omnidirectionally, except for the BCH, an uplink burst is always received before a downlink burst needs to be sent. This allows downlink bursts to be more accurately spatially directed. An uplink training sequence is embedded in every uplink burst to allow for moderately fast frequency hopping despite any decorrelation of the spatial channel with frequency.

The frequency hopping sequence may be any one of many different sequences well-known in the art. In one embodiment, the parameters of the frequency hopping scheme are initially unknown to the user terminal. This maximizes the flexibility of the network and increases the flexibility of the user terminal. As explained below, the frequency hopping parameters are transmitted to the user in the CM burst.

In one embodiment, the BCH channel is shared by all base stations in the wireless communication system. Using the 7 bit BSCC, up to 128 base stations can be accommodated. The BCH is part of a time division duplex channel with a repeating frame. The channel that includes BCH is a single RF carrier frequency used for uplink and downlink. For high noise environments or for increased robustness, the BCH can hop frequencies according to a predetermined scheme or be repeated on several different frequencies. The repeating frame includes the downlink BCH for each base station, labeled BS1 etc. as shown in Table 3 below. The next frame includes the uplink Configuration Request CR, labeled CR1 etc. and downlink Configuration Message CM, labeled CM1 etc. Each frame also includes a number of reserved slots, shown as empty boxes below. These slots can be used for data traffic, if the broadcast channel is also used for traffic, for other control messages or reserved to reduce interference on other channels in the network. In one embodiment, the other traffic channels hop frequencies around and through the BCH. The frames are repeated for each respective base station 1 to 128 to build a superframe as discussed in more detail below. After the last CM, CM128, the superframe repeats and begins again with the next superframe and the BCH for base station 1.

TABLE 3

|  |  | Uplink | Downlink |
|---|---|---|---|
| Superframe 1 | Frame 1 |  | BS1 |
|  | Frame 2 | CR1 | CM1 |
|  | Frame 3 |  | BS2 |
|  | Frame 4 | CR2 | CM2 |
|  | . . . | . . . | . . . |
|  | Frame 255 |  | BS128 |
|  | Frame 256 | CR128 | CM128 |
| Superframe 2 | Frame 1 |  | BS1 |
|  | Frame 2 | CR1 | CM1 |
|  | . . . | . . . | . . . |

In another embodiment, the BCH is on its own channel and CR and CM are on a separate control channel. Alternately, one BCH can be provided on a constant frequency and a secondary BCH can be provided on another channel with hopping frequency. The hopping channel is described in the CM.

Registration

In one embodiment of the present invention, a session begins when a user terminal seeks to register with a base station. The user terminal does this without knowing its relative position to the best station in terms of direction and distance (or range) to the base station (BS). Therefore, when the user terminal (UT or remote terminal or subscriber station) requests registration using a configuration request (CR) burst, the base station receives the transmission from the user terminal with a large timing uncertainty and unknown spatial parameters or weights when compared to traffic bursts that already utilize timing advance directives from the base station.

Before registration, several user terminals may transmit CR bursts during the same time slot to register with the same base station. CR bursts addressed to different base stations may also be received. The base station resolves these requests using spatial processing and multiple antennas. By combining the multiple antenna measurements (beamforming) the base station minimizes the interference between signals and maximizes the signal-to-noise ratio (SNR) of each received burst.

Beamforming can be performed in a variety of ways. In one embodiment, a training sequence is used with a least-squares cost function to determine the weights for a beamformer. This allows signals to be classified as desired or undesired. The training sequence-based approach uses an estimation of the timing and frequency offset of the CR burst. This estimation task can be performed by determining the least-squares cost for each timing and frequency hypothesis. This demands great computational resources. Using a special sequence design and a beamforming algorithm that does not require a search over the entire timing uncertainty range alleviates the computational load of the full search. In one embodiment, since CR bursts have a high timing inaccuracy, a periodic training sequence is dedicated for CR bursts alone.

Configuration Request Burst Structure

A configuration request (CR) burst is transmitted by a UT (user terminal) in order to initiate communications or registration with a BT (base station). It is transmitted after gathering information about the system by listening to (multiple) BCH (broadcast channel) bursts. The CR burst, is the first communication from a user terminal to the base station and therefore, the user terminal does not have any information about its range to its selected base station. Accordingly timing, range, and spatial processing weights among other things are all unknown to the base station.

The configuration request burst is composed of several fields which are listed in Table 4. The durations are described in terms of microseconds. In one embodiment, a symbol period is 2 microseconds.

TABLE 4

Configuration Request (CR) Burst fields

| Duration | Contents |
|---|---|
| 10 $\mu$sec | ramp-up |
| 240 $\mu$sec | training symbols $a_1, a_2, \ldots, a_{130}$ |
| 164 $\mu$sec | information symbols $h_1, h_2, \ldots, h_{82}$ |
| 10 $\mu$sec | ramp-down |
| 106 $\mu$sec | extra guard time |
| 15 $\mu$sec | inter-burst guard time |

The training symbols are allocated 240 microseconds in order to allow the signal to be accurately received and demodulated before a user terminal has registered and has received any knowledge of the system. The training symbols are discussed in more detail below.

The 82 information symbols are constructed from the configuration request message using, for example, forward error correction coding. In the present embodiment, the CR burst is modulated using $\pi/2$-BPSK modulation in order to decrease the peak-to-average ratio of the transmitted waveform.

The information symbols of the present CR burst are mapped out as shown in Table 5, below. Any of the items listed below can be deleted and transmitted later during the registration cycle or not at all based on the needs of the system. CR is scrambled by a function of BSCC ensuring that even if there is some interference from CRs sent to nearby base stations, the demodulation capture effect of the BSCC works out any collisions. In one embodiment, the scrambling is performed by taking the encoded bit sequence and exclusive OR'ing it with the output of a linear feedback shift register.

TABLE 5

Configuration Request Message

| Field | # of Bits |
|---|---|
| identity | 8 |
| utClass | 4 |
| txPwr | 5 |
| Total | 17 | identity is a set of unique random bits for each user terminal that differentiate simultaneous messages from multiple user terminals. Because of the randomness and large number of bits, it is unlikely that two user terminals will select the same identity code at the same time.

utClass identifies user terminal capabilities (highest modulation class, frequency hopping capabilities, etc.) This sequence identifies the type of user terminal that sent the CR. A palmtop digital assistant might have different capabilities than a desktop computer with a fixed dedicated antenna. With utClass, the different capabilities can be distinguished.

txPwr represents the power used by the user terminal to transmit the Configuration Request burst. For example, user terminal power=(2·txPwr−30) dBm.

The CR burst is sent on the control carrier, as an example, exactly 2265 μsec after receipt of a downlink BCH burst. In this way, an otherwise uninitialized user terminal can send CR without any knowledge of the frequency hopping sequence parameters. As discussed above, the CR burst is shorter than a standard uplink time-slot to allow for unknown time-of-flight from the user terminal to the base station and typically arrives late in the uplink time-slot receive window.

Configuration Message Burst Structure

Table 6 below summarizes the content of an example Configuration Message burst. The 494 information symbols are constructed from the configuration message using modulation and coding.

TABLE 6

| Duration | Contents |
|---|---|
| 10 μsec | ramp-up |
| 68 μsec | training symbols $a_1, a_2, \ldots, a_{130}$ |
| 988 μsec | information symbols $h_1, h_2, \ldots, h_{494}$ |
| 10 μsec | ramp-down |
| 15 μsec | inter-burst guard time |

The configuration message CM burst is sent on the BCH carrier, for example, exactly 5 msec after sending a downlink BCH burst, whenever CR was received on the corresponding uplink time-slot. Using this timing, CM is directed to the requesting user terminal. CM is also sent in a spatially directed signal based on the analysis of the spatial signature, for example parameters, such as DOA (direction of arrival) and TOA (time of arrival) of the uplink CR. Since CM is sent on the BCH carrier, a fixed time offset from BCH, an otherwise uninitialized user terminal can receive CM without any knowledge of the frequency hopping sequence parameters. CM, in response to CR, includes, among other things; the AFN (Absolute Frame Number), a larger timing-advance adjustment dynamic range, coarser power control, and various access control parameters. Table 7, below summarizes the content of the CM burst. Any of the items listed below can be deleted and transmitted later during the registration cycle or not at all based on the needs of the system.

TABLE 7

Configuration Message

| Field | # of Bits |
|---|---|
| identity | 8 |
| pwrCtrl | 4 |
| timingAdjust | 7 |
| AFN | 10 |

TABLE 7-continued

Configuration Message

| Field | # of Bits |
|---|---|
| carrierMask | 16 |
| racarrierMask | 16 |
| raslotMask | 3 |
| raDec | 3 |
| hopping | 1 |
| Total | 70 |

The meanings of the symbol sets are as follows:

identity: the random identity sent by the user terminal in the CR pwrCtrl: power offset that the user terminal should apply to future parameter request bursts and random access bursts: offset=(2·pwrCtrl−16) dB.

timingAdjust: timing advance that the user terminal should apply to future random access bursts: timing advance=timingAdjust μs.

AFN: the 10 least significant bits of the Absolute Frame Number carrierMask: bitmap of carriers containing traffic channels racarrierMask: bitmap of carriers containing random access channels (least significant bit is carrier 0)

raslotMask: bitmap of slots containing random access channels (least significant bit is slot 1). Random access channels occur where both racarrierMask and raslotMask are nonzero.

raDec: AFNs available for random access channels.

hopping: if equal to 1, the relationship between physical and logical carriers hops each frame.

Traffic Channel Burst Structure

In one embodiment, a user terminal forms a relationship with a base station called a registration or session. This registration begins by listening to a BCH (Broadcast Channel) and ends with a handover, timeout, or disconnection. The first step of registration is accomplished by a user terminal by sending a CR (Configuration Request) burst and receiving a CM (Configuration Message) burst. As described above, the CM contains basic configuration parameters such as hopping sequence calculation parameters. Using the information from the CM, the user terminal then opens an unauthenticated registration stream. During the registration stream, identities and capabilities are exchanged, operating parameters are set, and a RID (Registration Identifier) and PID (Paging Identifier) are assigned. Later, streams may be created and attached to this RID, or PID, and operating parameters. The specific details of registration are not provided here. Many other registration scenarios are also possible within the scope of the present invention.

The CM contains sufficient information for the user terminal to learn its distance and RF path-loss to the base station, correct its timing advance, adjust its power control, and learn the parameters of frequency hopping (e.g. frame numbering and BSCC. Based on this information from the CM, the user terminal, when it has data to transmit, can start a session, beginning with a RA-rreq (Random Access—registration request). If resources are available, the base station sends an AA—reg-ack (Access Assignment—registration-acknowledgment) to the user terminal assigning a traffic channel for the registration process. The base station and user terminal exchange various access control parameters including encryption keys on this established stream.

Finally a RID and PID are assigned. Using a RID or PID, the user terminal can establish secure streams in which it transmits and receives data packets on a TCH.

In spatial diversity radio communications systems, the present invention allows communications on the traffic channel (TCH) to start with reasonably accurate timing, frequency, and spatial diversity parameters. Beginning with more accurate parameters avoids the added latency of using several frames to gradually determine channel information. In one embodiment, the user terminals transmit omni-directionally from a single antenna and the base station uses spatial diversity antennas to receive and transmit using spatial diversity parameters. This allows signals transmitted on the same channel from e.g. different locations to be resolved and it allows the base station to send different signals to different user terminals on a single frequency. The registration process includes enough signaling for the base station to develop an accurate set of timing, frequency, and spatial parameters for sending any pages. However, in one embodiment, pages are sent in all directions, in case the user terminal has moved after registration or radio channel conditions have changed. In addition, as described above, the uplink random access bursts also have a fairly long training sequence. This allows the base station to refine the prior spatial processing parameters in the event that the user terminal has moved or the channel has changed.

A traffic channel (TCH) burst is transmitted by a user terminal or a base station in order to send traffic over the traffic channel. In one embodiment, TCH bursts are transmitted with idle bits when there is no data to transmit in order to maintain timing and spatial parameters. It is transmitted after CR and CM have been exchanged, after registration and after a stream has been opened on an assigned channel for data traffic. Accordingly, timing and frequency offset, as well as spatial signatures are already reasonably well-established. In one embodiment, timing is known to less than plus or minus two symbol times.

The TCH burst is composed of several fields which are listed in Table 8. The durations are described in terms of microseconds. In one embodiment, a symbol period is 2 microseconds and the uplink and downlink bursts differ as shown below. Alternatively, the bursts may be structured so that the uplink and downlink bursts have the same structure. The network may also be a network of peers so that uplink and downlink cannot be defined.

TABLE 8

Traffic Channel (TCH) Burst fields

| Duration Uplink | Duration Downlink | Contents |
|---|---|---|
| 10 μsec | 10 μsec | ramp-up |
| 146 μsec | 68 μsec | training symbols (73, 34) |
| 364 μsec | 988 μsec | information symbols (182, 494) |
| 10 μsec | 10 μsec | ramp-down |
| 15 μsec | 14 μsec | inter-burst guard time |

The training symbols are allocated 146 or 68 microseconds which corresponds to 73 or 34 symbols in order to allow the signal to be more accurately received and demodulated in the event that there has been any drift or movement between terminals. The training symbols are discussed in more detail below.

The 364 or 494 information symbols are constructed from the transmit data buffers. In the present embodiment, the TCH burst can be modulated in a variety of ways in order to increase data capacity of the system.

Training Sequences

For the TCH burst, timing and frequency offset are already reasonably well known due to the earlier exchange of CR and CM and registration. As a result, the training sequences can be simpler. For the uplink burst, the training sequence symbols are selected by the user terminal based on the BSCC and a value assigned to the user terminal by the base station. This allows bursts from different user terminals to be identified and distinguished from one another. The core sequence can alternatively be selected based on a serial number, product number, ID number or other stored number of the user terminal. In one embodiment, the training sequence has three parts, a 5 symbol prefix, a 63 symbol core and a 5 symbol suffix. The prefix is made up of the last 5 symbols of the core and the suffix is made up of the first 5 symbols of the core. The downlink training sequence is constructed similarly but has only a 24 symbol core for a total of 34 symbols. The particular length and symbol set for the training sequence is not important to the present invention, provided that the sequence is known. Many different configurations for the training sequence are possible. Similarly, it is not necessary to distinguish uplink and downlink sequences. However, for simplicity, the present invention shall be illustrated using the example of the 73 symbol uplink training sequence discussed above.

In use, the particular sequences are typically generated using a look-up table. The values in the table are selected based on autocorrelation, cross correlation, periodicity and similar properties. The bounds on auto and cross correlations help to make delayed versions of these sequences to appear partially uncorrelated to a least squares beamformer which resolves them.

TCH Burst Resolution

In this application, boldface text is used to represent vectors and normal text is used to represent scalars. The complete CR Burst training sequence is constructed from the core periodic sequence x consisting of 63 symbols $x_1, x_2, \ldots x_{63}$. Preceded by five prefix symbols and followed by five suffix symbols. A 4-symbol beam former analysis window is used to analyze the received training sequence since the timing is typically known to within plus or minus 2 symbols. The 5 symbol prefix and suffix ensure that any 63-symbol sample will fall within the training sequence. Since the suffix contains the first five symbols of the core sequence and the prefix contains the last 5 symbols of the core sequence, all 63 symbols of the core sequence will be within any 63-symbol sample even if the window is shifted up to 5 symbols early or late.

Figure 3:
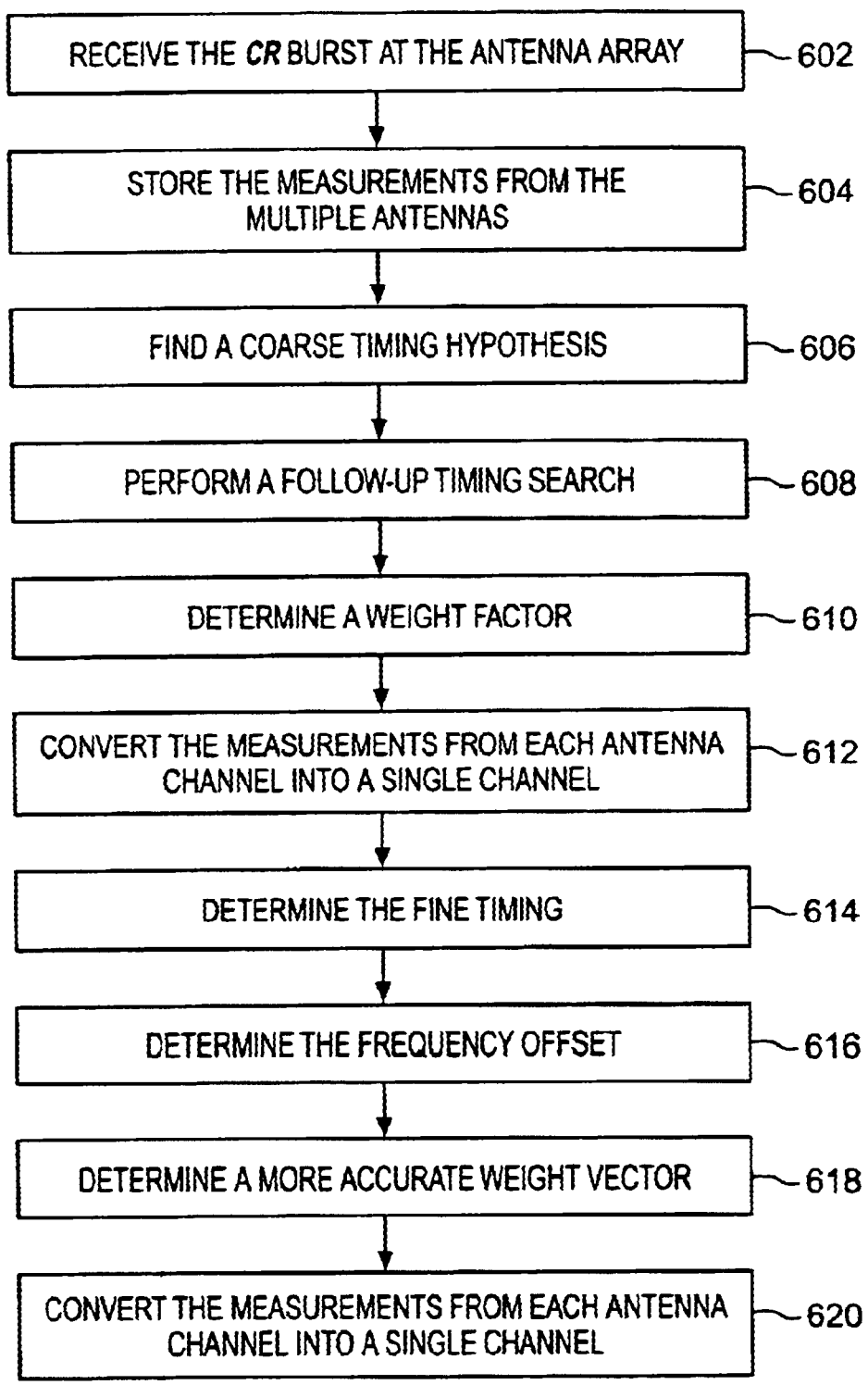
FIG. 3 is a flow chart of an implementation of aspects of the present invention.

FIG. 3 shows a flow diagram for resolving the TCH burst according to one embodiment of the invention. The TCH burst is received at the antenna array 602 and the measurements from the multiple antennas for the period that covers the beamformer analysis window are stored 604. Then the beamforming weights that will yield the minimum least squares (LS) error for each timing hypothesis in the analysis window of 4 symbols is determined. The least squares error results are used to find a coarse relative timing hypothesis 606. Finding this timing includes performing a coarse search for the symbol timing and performing a follow-up search 608.

A weight vector is then determined 610 using the relative timing. This weight vector is applied to the stored measurements to convert the measurements from each antenna channel into a single channel 612. Then, this single channel is analyzed to determine the fine timing 614 and the frequency offset 616 of the desired signal. With these new determinations a second single channel is created 620. With this new single channel, the TCH burst is demodulated and read 622.

The redetermined weight vector is also used to send a TCH message burst or other traffic back to the user terminal, 626. Before this is done, in order to optimize transmission reception, a calibration vector can be applied to the receive weight vector to determine a transmit weight vector 624. The calibration weight vector is based on the unique characteristics of the base station's transmission system as compared to its reception system.

This processing structure yields accurate beamformer weights that can be used to receive the desired signal. The beamformer weights can also be used to transmit a burst with appropriate spatial directionality and interference and noise suppression back toward the user terminal in the appropriate corresponding downlink slot.

Coarse Search for Relative Timing

After the TCH burst has been received in each of the antennas of the array 602 and the signals have been stored 604. The system can proceed to determine the relative timing based on the stored measurements 606. In one embodiment, this process is done using a covariance matrix computation and a Cholesky decomposition.

For measurements that lie in the beamforming analysis window of 63 symbols (the core sequence) assume that measurements are collected at 1.5 times the symbol rate. In this example, a search window is duration 4 symbols is used to accomodate the timing uncertainty. Next, assume that the variable, coreSnapPoint, points to the first snapshot that is in the beamformer analysis window, and r(t) denotes the snapshot (measurement vector) collected at time t seconds after the start of the TCH burst (relative to base station time). The covariance matrix R can be estimated as follows, where $T_{BAW}$ is the time of the beamforming analysis window:

$$R = \sum_{t \in T_{BAW}} r(t)r^H(t), T_{BAW} = \{t \mid coreSnapPoint \leq t < coreSnapPoint + 63\}$$

After computing the covariance matrix R, a matrix L can be found such that $$R = LL^H$$

L is termed as the Cholesky factor of R.

In one embodiment, the location of the first symbol of the core training sequence over the 4 symbols of the beamforming search window is searched for using a least-squares processor with a search step of 2/3 symbols. This results in 6 possible locations of the first symbol, i.e. 6 hypotheses and, accordingly, 6 least-squares (LS) error calculations. The vector coarseSearchGrid contains the delay hypothesis values for each 2/3 symbol increment built around nominal timing of zero. (The unit used here is a symbol period):

coarseSearchGrid=[−5/3, −1, −1/3, 1/3, 1, 5/3] which contains the delay values for the 6 hypotheses.

For each delay hypothesis k, (1≤k≤6), the following computations are performed:

Calculate cross-correlation vector $p_k$ each hypothesis:

$$p_k = \sum_{t \in T_{BAW}} r(t)d*(t+\tau_k)$$

In which r(t) is the received signal samples and d(t) is the samples of the desired signal. The desired signal samples are assumed to be available over-sampled at 24 times the symbol rate. The value $\tau_k$ is the assumed delay for the k-th hypothesis, i.e., $\tau_k$=coarseSearchGrid (k).

Back Substitution: The resulting vector $p_k$ is applied to solve for an interim vector $x_k$ for each hypothesis k, where L is the Cholesky factor as mentioned above:

$$Lx_k = p_k$$

Then the least-squares (LS) fit for each hypothesis is computed:

$$f_k = f(\tau_k) = \sum_{t \in T_{BAW}} |d(t+\tau_k)|^2 - X_k^H X_k$$

Figure 4:
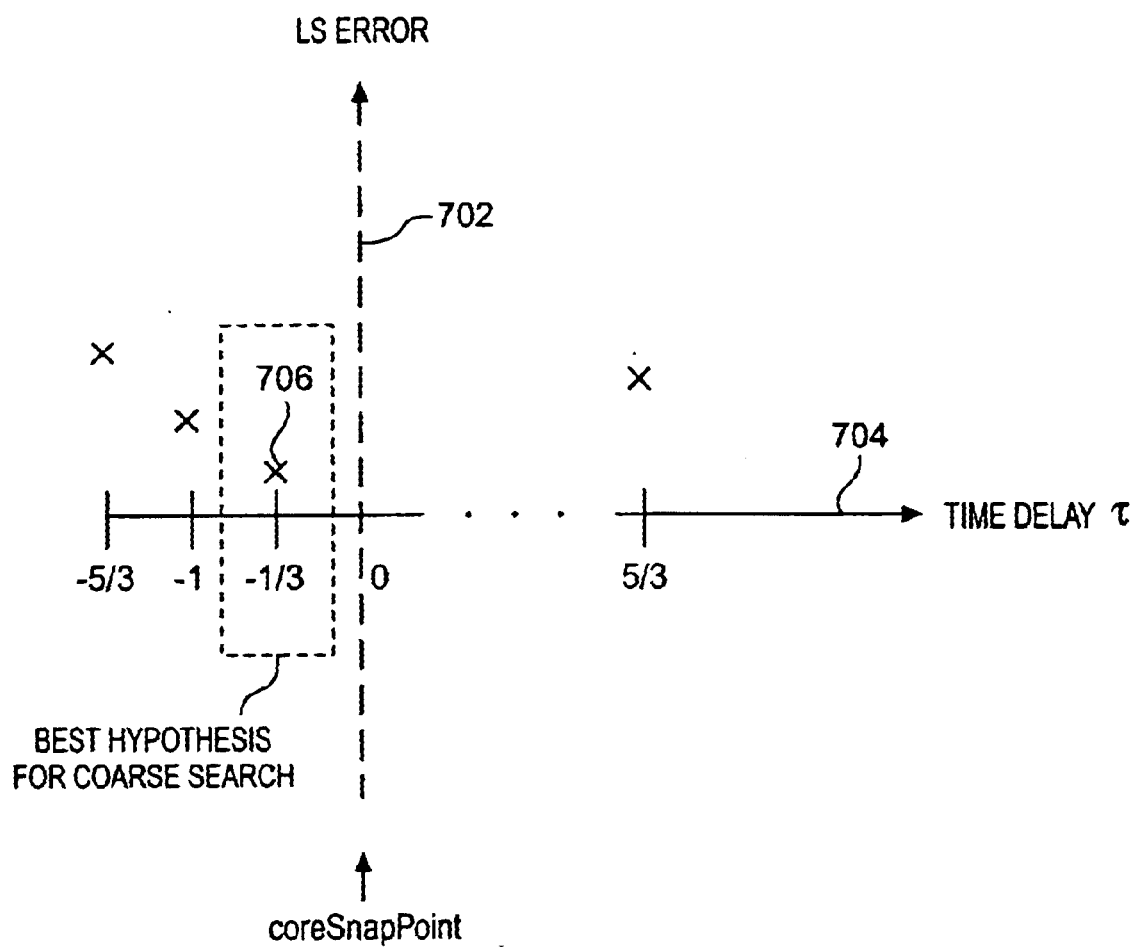
FIG. 4 is a graph of a search for a least squares error relative timing.

FIG. 4 shows the LS cost function on the vertical axis 702 as a function of the time delay τ for the 6 hypotheses on the horizontal axis 704. The horizontal axis is marked in units of 2/3 of a symbol time in accord with the sampling rate of 1.5 times the symbol rate. The selected best coarse search time delay estimate 706 is shown in FIG. 4 at τ=−1/3 symbols. Note that the delay is measured with respect to the nominal time at which the TCH burst is expected to arrive. This nominal time is named the coreSnapPoint.

Follow-up Search

Having made a coarse determination of the relative timing 606 a follow-up timing search 608 can be performed. This search has one more LS error calculation. The result of this calculation can be compared to the best LS error from the coarse search.

The endpoints of the LS error vector $f_k$ from the coarse search are forced to be very large. In this way, if the minimum value is at one end of the range, the next closest value will be one of the six estimates.

In the coarse search, the following 8 dimensional vectors were formed:

updatedLSValues=[$f_6$, $f_1$, $f_2$, $f_3$, $f_4$, $f_5$, $f_6$, $f_1$]

and updatedCoarseSearchGrid=[−5/3, −1, −1/3, 1/3, 1, 5/3]

Assume that the hypothesis of $f_3$ (τ=−1/3) (of the current list) was selected by the coarse search procedure because $f_3 < f_2 < f_4$. In the follow-up search procedure, the LS error is computed for τ=−2/3, since this forms the midpoint of the range between the delays corresponding to $f_2$ (τ=−1) and $f_3$ (τ=−1/3). This is shown graphically in FIG. 5.

Figure 5:
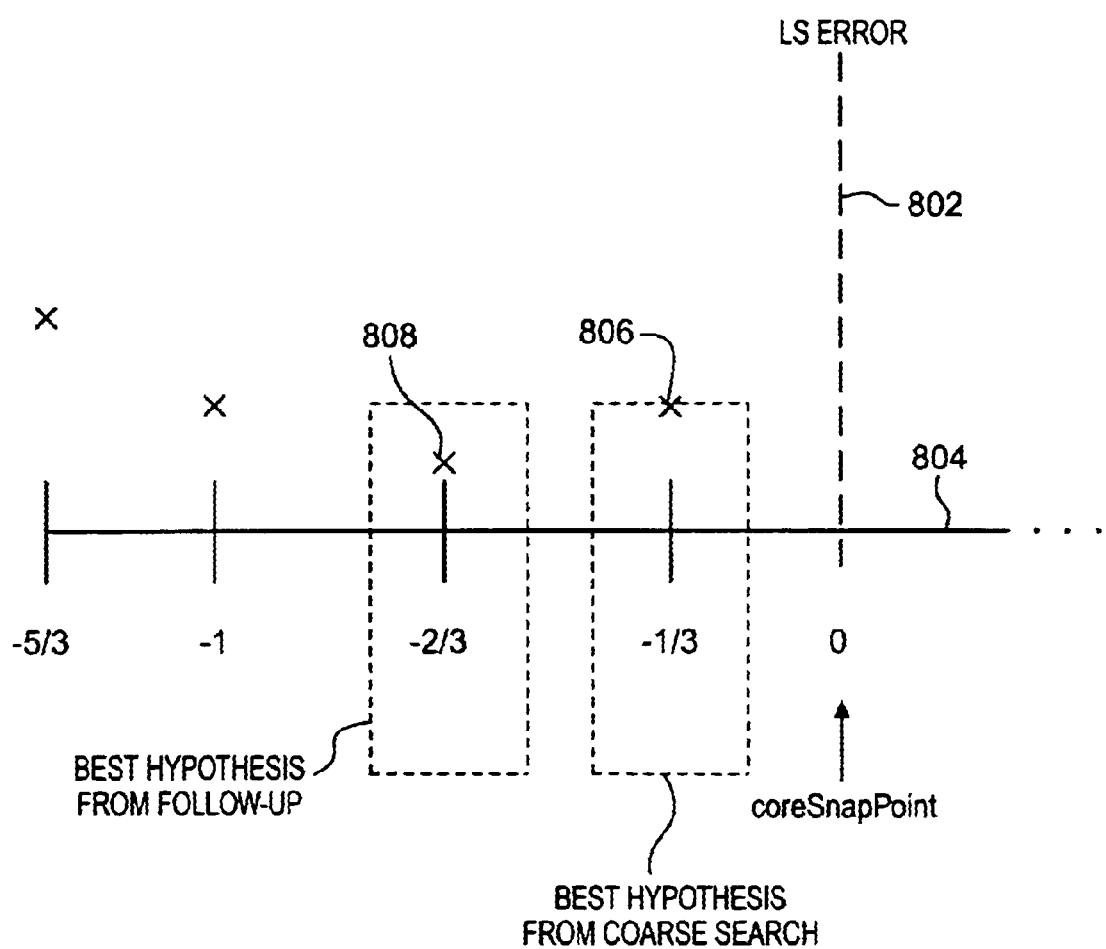
FIG. 5 is a graph of a follow-up search for a least squares error relative timing.

FIG. 5 shows the LS cost function 802 as a function of the 6 hypotheses 804 in which the time domain is again sampled at a rate of 1.5 times the symbol rate. The selected best case coarse search time delay estimate 806 is τ=−1/3 symbols. After the additional hypothesis test, the hypothesis (among the 7 of them) which corresponds to the minimum least-squares error is again picked. In this example, $\tau_o$=−2/3 is the delay value 808 that accomplishes this.

Beamforming Weights

After the follow-up search, determining the relative timing delay τ to within one third of a symbol period 608, the weight vector $w_o$ is recomputed to extract the desired signal as follows:

Using the cross-correlation vector $p_o$ for the best hypothesis:

$$p_o = \sum_{t \in T_{BAW}} r(t)d*(t+\tau_o)$$

And the corresponding interim vector $x_o$:

$$Lx_o = p_o$$

The weights can be computed by solving the following back substitution:

$$L^H w_o = p_o$$

With the resulting LS error which is already determined to be $f(\tau_o)$:

$$f(\tau_o) = \sum_{t \in T_{BAW}} |d(t+\tau_o)|^2 - x_o^H x_o$$

The beamforming operation results in a single channel measurement that shall be named g(t) and defined as follows:

$$g(t) = w_o^H r(t)$$

Note that the frequency estimation (search) has not yet been performed. This reduces the search to a single dimension, namely time-delay. The frequency search can be avoided because of the duration of the beamforming analysis window, the maximum frequency deviation expected in the received signal and the target SNR level at the output of the beamformer. When the beamformer analysis window is short enough to make the frequency offset negligible, the desired signal mismatch is not significant enough to degrade performance. Furthermore, the inability to improve the SNR even by using an MSE beamformer (that knows the perfect covariance matrix and steering vector) to high levels (above 5 dB) makes the actual beamformer blind to imperfections in the desired signal (such as frequency offset). In one embodiment, the TCH burst payload operates with SNRs between 0 dB and 20 dB. Furthermore, the single channel estimation of frequency and fine timing that follows will alleviate these SNR problems using fewer computations.

Fine Timing Estimator

The coarse search and the follow-up search provide a timing delay with an effective rate of three times the symbol rate. The timing resolution can be improved to better demodulate the payload. Severe intersymbol interference can be expected at the worst case timing events (1/6 symbol period of timing error). To estimate fine timing 614, the Oerder-Meyr blind timing estimator can be used. This estimator is blind in the sense that it does not assume any knowledge of the transmitted symbols. Therefore it is insensitive to frequency offset errors. The Oerder-Meyr estimator can be used as follows:

First, interpolate g(t) to 3 times the symbol rate (from 1.5 times the symbol rate) using an interpolation filter, and call the output $g_i(t)$. The duration of the measurements process amounts to 63+5+100=168 symbol periods, this is the core sequence, plus the suffix, plus the first 100 information symbols. Using the information symbols enhances the accuracy of the fine timing estimator. Alternatively, the symbols can be sampled at a three times rate originally. In such a case, only every other sample would be used in the coarse search and follow-up search.

Next, the interpolated signal is passed through a memoryless nonlinearity to obtain $$g_n(t) = |g_i(t)|.$$

The absolute value nonlinearity generates tones at the multiples of the symbol rate. The nonlinearity is approximated by fitting a polygon. For example, if z is a complex number with representation $z = z_{r+jzi}$, then $|z| \approx \max(|z_r|, |z_i|) + 0.34 \times \min(|z_r|, |z_i|)$. The zero-crossing of the complex sine wave at the symbol rate is determined by using a 3 point DFT and this location is termed as a symbol transmission instant. Finally, the symbol transmission instant is found that is closest to the position identified by the follow-up search as the location for the first symbol of the periodic training sequence. The closed-form estimate obtained using the Oerder-Meyr timing estimator is termed as $\tau_{fine}$.

Coarse Frequency Estimator

After fine timing is acquired 614, the measurements are used in the analysis window together with the desired signal to compute the cross correlation function and determine the coarse frequency estimate 616 as the peak of the cross correlation function. For simplicity, this analysis is done at the 1.5 times over sampling rate (instead of the 3 times rate used for the fine timing search), however many other sampling rates can be used. Specifically, for the m-th frequency hypothesis, the function freqMatch(m) is computed:

$$freqMatch(m) = \left| \sum_{t \in T_{BAW}} g(t) d * (t + \tau_{fine}) \exp(-j2\pi f_m t) \right|^2$$

The frequency candidate that maximizes freqMatch(m) is selected as the frequency estimate, $f_{coarse}$. Frequency candidates ($f_m$'s) expressed in $H_z$ are in the set:

{−500, −375, 250, −125, 125, 250, 375, 500}

Alternatively, the frequency uncertainty can be regarded as much less and fewer hypothesis tests can be performed.

More Accurate Beamforming

Using the frequency and timing estimates $\tau_{fine}$, $f_{coarse}$, an improved weight vector, $w_{final}$ can be determined 618 and applied to the found core sequences to obtain an estimate of the desired burst $\hat{s}(t)$:

$$\hat{s}(t) = w_{final}^H r(t)$$

The more accurate weight vector is obtained by employing $d(t+\tau_{fine}) \exp(j2\pi f_{fine} t)$ as the desired signal in the LS error computations. However, if the corresponding LS error is larger than the follow up search based LS error $f_o$, the fine timing and frequency estimates are rejected and the estimates are set to $\tau_{fine} = \tau_o$ and $f_{coarse} = 0$, which results in $w_{final} = w_o$.

To further improve the SNR results at high post-copy SNR levels, the search can be performed for a fine frequency estimate around the coarse frequency estimate at locations $f_{coarse} + [-800, 0, 800]$ using an LS fit to multichannel measurements for $t = \tau_{fine}$. Such a search can be included to improve the frequency estimation performance for the CR burst demodulator.

The weight vector can then be recomputed using the best of all estimates to minimize error. Finally the input signal can be copied using the spatial weight, applied timing and frequency offset 620. This input signal is the originally received 1.5 times oversampled signal using values from all of the diversity antennas. After the weight vector is applied, the symbol timing alignment is applied using a filter bank. This provides baud-aligned samples at the baud rate. The frequency offset is compensated on these baud-aligned samples. The decoder gets the on-baud samples and then decodes the information symbols to obtain the bits. The decoder architecture depends on what type of encoder is used in the transmitter.

General Matters

The method discussed above results in modifying the received signal in terms of time delay and frequency offset. This results in keeping the measurements the same and therefore it is not necessary to recompute the sample covariance matrix and its Cholesky decomposition for each hypothesis. This results in significant computational advantages.

Although, a two dimensional search procedure, i.e. a search over time and frequency has been described, a single dimensional search can also be used. In addition, the above described approach uses multichannel measurements for the overall search procedure. Significant computational reductions are possible if a subset of the total measurements properly obtained are used by decomposing the original measurements.

In, for example, a GSM (Global System for Mobile Communications) setting, the training sequence is short enough so that the frequency offset does not create distortion in the least-squares process and can safely be ignored.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps. The steps of the present invention may be performed by hardware components, such as those shown in FIGS. 1 and 2, or may be embodied in machine-executable instructions, which may be used to cause a general-purpose or special-purpose processor or logic circuits programmed with the instructions to perform the steps. Alternatively, the steps may be performed by a combination of hardware and software. The steps have been described as being performed by either the base station or the user terminal. However, any steps described as being performed by the base station may be performed by the user terminal and vice versa. The invention is equally applicable to systems in which terminals communicate with each other without either one being designated as a base station, a user terminal, a remote terminal or a subscriber station. The invention can further be applied to a network of peers.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Importantly, while the present invention has been described in the context of a wireless internet data system for portable handsets, it can be applied to a wide variety of different wireless systems in which data are exchanged. Such systems include voice, video, music, broadcast and other types of data systems without external connections. The present invention can be applied to fixed remote terminals as well as to low and high mobility terminals. Many of the methods are described in their most basic form but steps can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

What is claimed is:

1. A method comprising:
   receiving a burst having a known training sequence at a set of diversity antennas;
   sampling the received burst at each antenna;
   determining a coarse timing estimate for samples from at least one antenna;
   calculating a spatial weighting vector using values computed in determining the coarse timing estimate;
   applying the spatial weighting vector to the received burst samples for each antenna to form a single channel signal;
   determining a fine timing estimate for the single channel signal;
   determining a second spatial weighting vector using the fine timing estimate;
   applying the second spatial weighting vector to the received burst samples for each antenna to form a second single channel signal; and
   demodulating the second single channel signal.

2. The method of claim 1, further comprising determining a frequency offset estimate for the single channel signal and wherein determining a second spatial weighting vector includes using the frequency offset estimate.

3. The method of claim 2, wherein determining a frequency offset comprises calculating cross correlation vectors for a plurality of candidate offsets based on a portion of the samples and selecting a candidate corresponding to a peak of a cross-correlation function.

4. The method of claim 1, further comprising refining the coarse timing estimate by analyzing hypothetical timing estimates proximate the coarse timing estimate.

5. The method of claim 1, wherein determining a coarse timing estimate comprises:
   calculating a cross correlation vector for a portion of the samples with respect to a selected part of the known training sequence, each cross correlation vector corresponding to a relative timing hypothesis and each cross correlation vector combining samples that occur at intervals within an analysis window;
   calculating a least squares fit for each hypothesis using the calculated cross correlation vectors; and
   selecting the combination of samples corresponding to the minimal least squares fit as the coarse timing of the received burst.

6. The method of claim 5, wherein calculating a least squares fit comprises comparing a hypothetical received sequence to the known training sequence for each hypothesis.

7. The method of claim 6, wherein the hypothetical received sequence is determined based on the cross correlation vector and a Cholesky factor.

8. The method of claim 5, wherein calculating a cross correlation vector comprises calculating a cross correlation vector for a portion of evenly spaced ones of the samples.

9. The method of claim 5, wherein determining a fine timing estimate further comprises determining the fine timing of the selected combination of samples by applying a timing estimation algorithm to an interpolated sequence of the selected combination of samples.

10. A machine-readable medium having stored thereon data representing sequences of instructions which, when executed by a machine, cause the machine to perform operations comprising:

receiving a burst having a known training sequence at a set of diversity antennas;

sampling the received burst at each antenna;

determining a coarse timing estimate for samples from at least one antenna;

calculating a spatial weighting vector using values computed in determining the coarse timing estimate;

applying the spatial weighting vector to the received burst samples for each antenna to form a single channel signal;

determining a fine timing estimate for the single channel signal;

determining a second spatial weighting vector using the fine timing estimate;

applying the second spatial weighting vector to the received burst samples for each antenna to form a second single channel signal; and demodulating the second single channel signal.

11. The medium of claim 10, further comprising instructions which, when executed by the machine, cause the machine to perform further operations comprising determining a frequency offset estimate for the single channel signal and wherein determining a second spatial weighting vector includes using the frequency offset estimate.

12. The medium of claim 11, wherein the instructions for determining a frequency offset further comprise instructions which, when executed by the machine, cause the machine to perform further operations comprising calculating cross correlation vectors for a plurality of candidate offsets based on a portion of the samples and selecting a candidate corresponding to a peak of a cross-correlation function.

13. The medium of claim 10, further comprising instructions which, when executed by the machine, cause the machine to perform further operations comprising refining the coarse timing estimate by analyzing hypothetical timing estimates proximate the coarse timing estimate.

14. The medium of claim 10, wherein the instructions for determining a coarse timing estimate further comprise instructions which, when executed by the machine, cause the machine to perform further operations comprising:

calculating a cross correlation vector for a portion of the samples with respect to a selected part of the training sequence, each cross correlation vector corresponding to a relative timing hypothesis and each cross correlation vector combining samples that occur at intervals within an analysis window;

calculating a least squares fit for each hypothesis using the calculated cross correlation vectors; and selecting the combination of samples corresponding to the minimal least squares fit as the coarse timing of the received burst.

15. The medium of claim 14, wherein the instructions for calculating a least squares fit further comprise instructions which, when executed by the machine, cause the machine to perform further operations comprising comparing a hypothetical received sequence to the known sequence for each hypothesis.

16. The medium of claim 15, wherein the hypothetical received sequence is determined based on the cross correlation vector and a Cholesky factor.

17. The medium of claim 14, wherein the instructions for calculating a cross correlation vector further comprise instructions which, when executed by the machine, cause the machine to perform further operations comprising calculating a cross correlation vector for a portion of evenly spaced ones of the samples.

18. The method of claim 14, wherein the instructions for determining a fine timing estimate further comprise instructions which, when executed by the machine, cause the machine to perform further operations comprising determining the fine timing of the selected combination of samples by applying a timing estimation algorithm to an interpolated sequence of the selected combination of samples.

19. An apparatus comprising:

a set of diversity antennas to receive a burst having a known training sequence;

means for sampling the received burst at each antenna;

means for determining a coarse timing estimate for samples from at least one antenna;

means for calculating a spatial weighting vector using values computed in determining the coarse timing estimate;

means for applying the spatial weighting vector to the received burst samples for each antenna to form a single channel signal;

means for determining a fine timing estimate for the single channel signal;

means for determining a second spatial weighting vector using the fine timing estimate;

means for applying the second spatial weighting vector to the received burst samples for each antenna to form a second single channel signal; and means for demodulating the second single channel signal.

20. The apparatus of claim 19, further comprising means for determining a frequency offset estimate for the single channel signal and wherein the means for determining a second spatial weighting vector includes means for using the frequency offset estimate.

21. The method of claim 1, wherein the burst is configured in accordance with at least one of a TDMA, a FDMA, a CDMA and a TDD radio communications system.

22. The medium of claim 10, wherein the burst is configured in accordance with at least one of a TDMA, a FDMA, a CDMA and a TDD radio communications system.

23. The apparatus of claim 19, wherein the apparatus is comprised in at least one of a TDMA, a FDMA, a CDMA and a TDD radio communications system.

24. The method of claim 5, wherein calculating a spatial weighting vector comprise using a Cholesky factor and the cross correlation vector corresponding to the selected combination of samples.

25. The medium of claim 14, wherein the instructions for calculating a spatial weighting vector further comprise instructions which, when executed by the machine, cause the machine to perform further operations comprising using a Cholesky factor and the cross correlation vector corresponding to the selected combination of samples.

* * * * *